United States Patent

Hardesty

[11] 3,737,261
[45] June 5, 1973

[54] RESIN IMPREGNATING SYSTEM

[75] Inventor: Ethridge E. Hardesty, Pine Valley, Calif.

[73] Assignee: Goldsworthy Engineering, Inc.

[22] Filed: Feb. 16, 1971

[21] Appl. No.: 115,514

[52] U.S. Cl. ................. 425/113, 425/75, 425/174.2, 425/405
[51] Int. Cl. ................................. B29f 3/10
[58] Field of Search........................425/75, 110, 113, 425/122, 127, 174; 118/404, 405, DIG. 11

[56] References Cited

UNITED STATES PATENTS

| | | | |
|---|---|---|---|
| 1,826,297 | 10/1931 | Apple | 118/405 X |
| 3,134,832 | 5/1964 | Smith | 425/113 X |
| 3,456,295 | 7/1969 | Torigai et al. | 425/174 X |
| 3,159,877 | 12/1964 | Orsini | 425/113 |

*Primary Examiner*—H. A. Kilby, Jr.
*Attorney*—Robert J. Schaap, Neal E. Willis and John D. Upham

[57] ABSTRACT

A resin impregnating system in the form of an open-ended tubular housing or canister is provided with a pair of flexible rubber seals at the transverse open ends to accommodate the reinforcing material forming part of a reinforced plastic member passing through the housing. The housing is provided with a suitable resin matrix material which is capable of impregnating the reinforced plastic member passing through the housing. The reinforced plastic member is typically formed of a textile strand material which is capable of receiving the resin matrix. Transducers capable of being operated by sonic energy are located in the housing for forcing the resin into the textile strand material. Another embodiment of the invention discloses a canister divided into two compartments where the first compartment is maintained under vacuum conditions for removing any entrained air in the textile strand material. The member passes immediately from the first compartment into the second compartment which is maintained under pressure for forcing the resin matrix into the voids left by the removed air in the textile strand material.

11 Claims, 5 Drawing Figures

INVENTOR
ETHRIDGE E. HARDESTY
BY Robert J. Schaap
ATTORNEY

RESIN IMPREGNATING SYSTEM

This invention relates in general to certain new and useful improvements in resin impregnating devices, and more particularly, to an improved resin impregnating device for effectively resin impregnating textile strand material.

In recent years, the use of fiber reinforced composites has received widespread acceptance. With the advent of more effective and efficient manufacturing systems, tanks, pipes, high pressure bottles, and similar structures are now being fabricated from reinforced plastic composite materials where they were formerly made from steel, other heavy metals, or other conventional materials of construction.

The increased technology in the manufacturing of articles from reinforced plastic materials has enabled these articles to be made at relatively high production rates. This increase in production has resulted in a demand for more effective resin impregnating systems. It has been found that the filament strand material must be efficiently impregnated with a suitable curable resin matrix in order to render an efficient end product. However, while the machinery capable of producing the end reinforced plastic product has been improved dramatically, relatively little attention has been directed to a suitable technique for resin impregnating the strand material which is used in the making of the reinforced plastic composite. Typically, most of the extant machinery relies upon a well-known conventional "dip-tank", where the strand material is merely brought into contact with a resin in a trough or tank.

This resin impregnating system has proved to be relatively ineffective in that if the strand material is closely bunched together during introduction into the resin solution, some of the strand material is not sufficiently impregnated. Furthermore, in many cases the strand material may receive an excess amount of resin. Either of these situations results in an end product which is either resin-rich or resin-poor and this condition substantially affects the overall desired strength characteristics in the final product.

It is, therefore, the primary object of the present invention to provide a resin impregnating system which is capable of being regulated to provide a preselected quantity of resin matrix to a filamentary strand material.

It is another object of the present invention to provide a resin impregnating system of the type stated which is relatively economical to manufacture and which is also highly efficient in its operation.

It is a further object of the present invention to provide a resin impregnating system of the type stated which is capable of effectively removing entrained air in the filamentary strand material and replacing the entrained air by a suitable quantity of resin matrix.

With the above and other objects in view, my invention resides in the novel features of form, construction, arrangement, and combination of parts presently described and pointed out in the claims.

Figure 1:
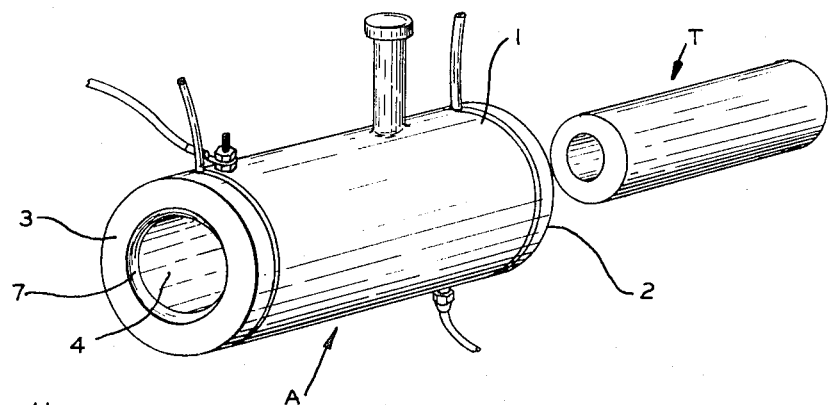
FIG. 1 is a perspective view of a resin impregnator constructed in accordance with and embodying the present invention.

Generally speaking, the resin impregnator of the present invention is constructed in the form of a tubular canister or housing which is open-ended. The housing is provided with a central bore having an interior angular side wall which is slightly spaced from the exterior surface of a tubular member passing through the open ends of the housing. The housing may also be provided with a flexible tube to provide a source of resin matrix. At each of the transverse ends of the housing, inflatable seals are provided. The seals are inflated to engage the tube passing through the housing with the desired amount of pressure to be maintained on the tube. These seals prevent any of the resin matrix from oozing outwardly of the housing and to maintain proper pressure within the housing in order to provide the desired amount of impregnation.

Another form of resin impregnator of the present invention includes a series of axially spaced circumferentially disposed plates which serve as force transducers and are sonically driven by means of a sonic energy generator. This form of housing is also provided with the inflatable seal at each of the transverse ends.

As further modification of the present invention, an open-ended tubular housing is provided with two compartments. The first of these compartments is maintained under a vacuum so that the tubular structure which is introduced into the housing is subjected to the vacuum conditions. The vacuum is effective to remove any entrained air in the filamentary strand material which forms part of the tubular member. The tubular structure is thereafter immediately passed into a second compartment where the compartment is maintained under pressure and the tubular member is brought into contact with the resin matrix. The resin matrix which is maintained under pressure is thereupon forced into the voids of the tubular member which remain after removal of the entrained air. Force transducers may also be located in this latter compartment of the housing. Inflatable rubber seals are also located on each of the transverse ends of the housing and are located intermediate between the two sections in order to maintain the proper pressure conditions.

Referring now in more detail and by reference characters to the drawings which illustrate practical embodiments of the present invention, A designates a resin impregnator which comprises an outer housing 1 having right and left end walls 2, 3. The housing 1 is provided with axially extending aperture or central bore 4 capable of receiving an article T such as a tubular member made of reinforced plastic material.

The open ended tubular housing or so-called "canister" 1 is circular in vertical cross section and includes a relatively thick annular wall 5 which forms the central bore 4. The annular wall 5 is provided with a series of axially spaced circumferentially disposed circular plates 6 which serve as force transducers or so-called "sonic drivers". Each of the plates 6 is in turn connected to a suitable sonic energy generator (not shown) for generating the necessary energy to drive the resin into the tubular member passing into the housing 1.

Figure 2:
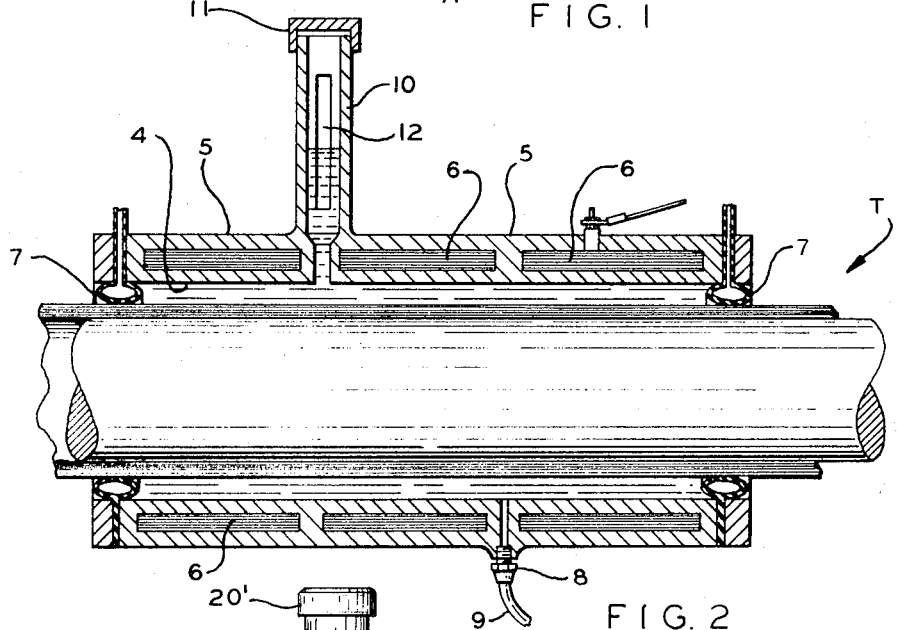
FIG. 2 is a vertical sectional view taken along line 2—2 of FIG. 1.

At each transverse end, the interior surface of the annular wall 5 is provided with a neoprene rubber seal 7 having an internal diameter which is sufficient to enable a filament wound tube T to pass therethrough. By reference to FIG. 2, it can be seen that the seals 7 are sized to accommodate the tube T as it passes through the housing 1. Furthermore, the seals 7 are sufficiently flexible to yield in order to accommodate nonlinearities in the circular dimension of the tube T passing through the housing 1. The seals 7 are also sufficiently rigid to maintain a substantially fluid-tight engagement between the surface of the tube T and the interior of the housing 1. While the distance existing between the exterior surface of the tube T and the interior surface of the annular wall 7 has been illustrated as being rather large, this illustration is only for purposes of describing the present invention. However, it should be recognized that this annulus has a substantially small thickness and that the exterior surface of the tube T is only very slightly spaced from the interior surface of the wall 5.

The housing 1 is also provided with a fitting 8 and a tube 9 connected to a suitable source of liquid resin (not shown). In this manner, it is possible to continually supply a resin matrix to the housing 1. In like manner, the housing 1 is also provided with an upwardly extending hollow standpipe 10 which serves as an air accumulator. The standpipe 10 is provided with a removable cap 11 and a sight glass 12 which extends for the greater portion of the vertical length of the standpipe 10. Air which has been entrained in the various strands of the filament will be displaced by the liquid resin as the strands enter into the housing 1. This air will be normally biased into the standpipe 10 where it will displace and force downwardly the liquid resin therein. The amount of the displaced air which has accumulated in the standpipe 10 can be observed through the sight glass 12 from time to time. After a sufficient quantity of air has been accumulated, the cap 11 can be removed for bleeding off the accumulated air. As this occurs, the standpipe will normally be filled with the resin under pressure. It can be observed that the same pressure conditions will always be maintained within the housing 1 regardless of the amount of air which has been accumulated in the standpipe 10.

It has been found that the use of sonic energy is very effective in urging the resin material into the strands which form the tube T. It should be recognized that the tube T may be slightly resin wetted prior to its entry into the housing. This is often desirable and it has been found that the rate of impregnation increases rapidly when the surface of the tubular member has been resin wetted. The resin wetting can occur by any conventional technique. Furthermore, it should be observed that the filamentary strands which form the tubular member are oftentimes closely bound together. Typically, the strands may have been applied to a mandrel in such fashion that the tube comprises longitudinal strands, helical strands, and circumferential strands. This type of closely knit structure oftentimes prevents complete impregnation of the strands located at the innermost portion of the tube. However, it has been found that by forcing the resin matrix into the tubular structure T through the use of sonic energy, that essentially all strands are suitable coated.

It should also be observed that the present invention is not limited to the application of resin to tubular members, per se. It has been found that this type of resin applicator is suitable for impregnating many forms of structures which have been formed of filamentary strand materials.

As used herein, the term "sonic" is not limited to that energy source which is within the normal hearing range, namely 16 cycles per second to 16 kilocycles per second. The term "sonic" also includes the subsonic range which is approximately 0 to 60 cycles per second, the ultrasonic range which is approximately 17 kilocycles per second to 780 kilocycles per second and the hypersonic range which is approximately 1 megacycle per second to approximately 15 megacycles per second, as well as the sonic range.

Any large number of resin matrix materials can be used in the resin impregnator of the present invention. Typically, the resin selected would be dependent upon the end product which is to be produced and the type of filamentary material which is employed in the reinforced plastic composite. Some examples of suitable resin matrix materials which can be employed in the present invention are various thermoplastic resins such as nylon, polyethylene, polypropylene, many of the polycarbonates, polyesters, etc. Other resin matrix materials which can be employed are waxes, eutectic ceramics, eutectic metals, synthetic rubbers, etc.

Figure 3:
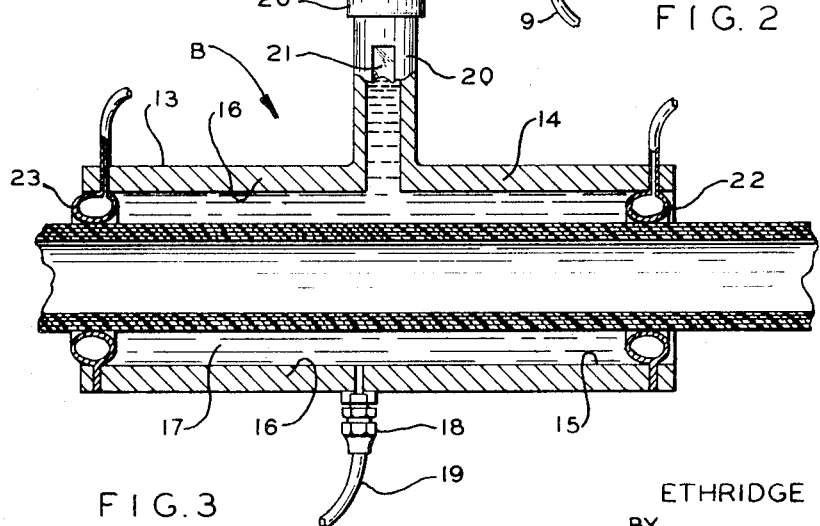
FIG. 3 is a vertical sectional view of a modified form of resin impregnator constructed in accordance with and embodying the present invention.

It is also possible to provide a modified form of the present invention which is more fully illustrated in FIG. 3 and which discloses a contact resin impregnator B. The resin impregnator B generally comprises an open-ended tubular housing 13 which is circular in vertical cross section and has an annular side wall 14 with a central bore 15. The housing 14 is provided with an interior annular side wall 16 which is slightly spaced from the exterior surface of the tube passing through the bore 15 thereby forms an annulus 17 therebetween. The housing 13 is also provided with a fitting 18 and a flexible tube 19 connected to some suitable source of resin matrix (not shown). In like manner, the housing 13 is also provided with an upstanding standpipe 20 having a removable cap 20 for accumulation of entrained air. The standpipe 20 is also provided with a sight glass 21 for observing the amount of air which has accumulated therein.

At each of its transverse ends, the housing 13 is provided with inflatable seals 22, 23. The seals 22, 23 are conventional in their construction and may be provided with a nipple or similar valve structure for providing an air seal. The seals may be inflated to engage the tube passing through the bore 15 with the desired amount of pressure On the tube. The rear seals 12 are inflated generally with a low air pressure source in order to maintain the proper pressure in the housing 23 to prevent any of the liquid resin from oozing outwardly through the seal 22. The forward seal 23 is regulated with pressure in order to obtain the proper resin deposition on the exterior surface of the tube. If the seal 23 was inflated with only a slight amount of pressure, then a fairly thick resin coating would exist on the surface of the tube. In like manner, if the seal 23 was inflated to a fairly high pressure, it would engage the side wall of the tube passing through the housing 23 with a fair amount of pressure and prevent a resin rich coating from existing on the surface of the tube as it passed through the housing 23. Furthermore, by inflating the seal 23 to a fairly substantial pressure, the seal will serve as a type of wiper and in essence serve to remove some of the resin matrix which may exist on the exterior surface of the tube T.

Figure 4:
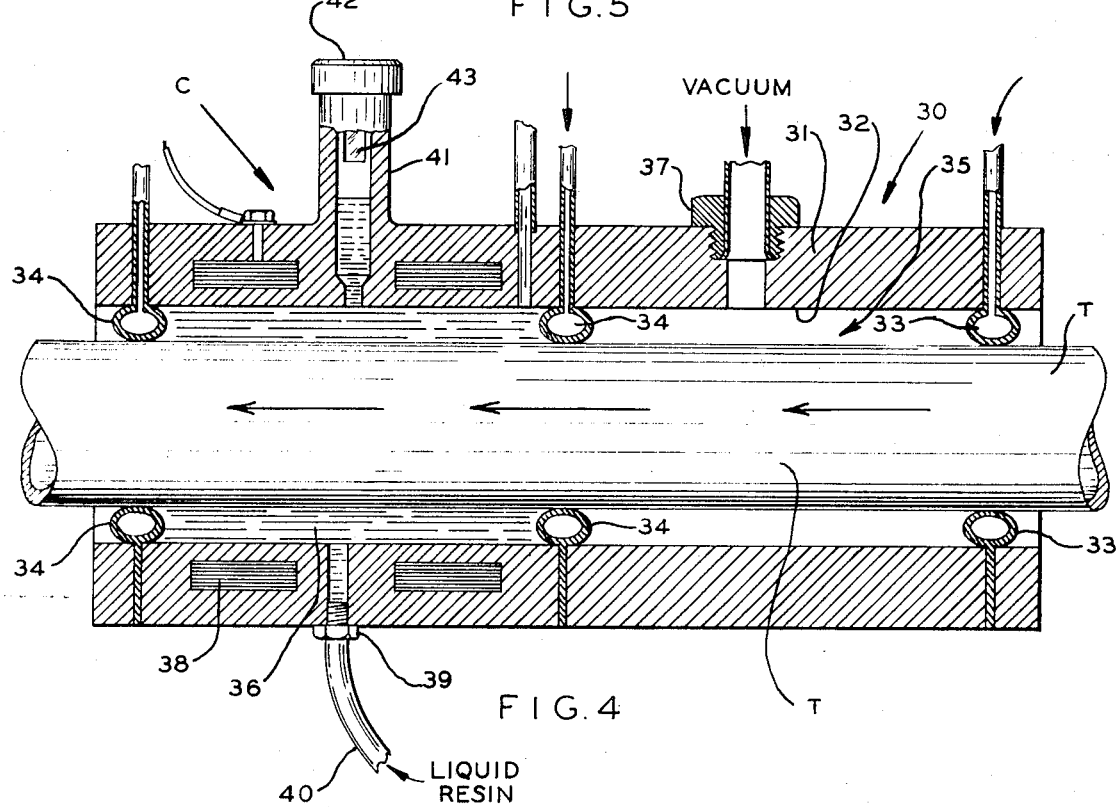
FIG. 4 is a vertical sectional view of another modified form of resin impregnator constructed in accordance with and embodying the present invention.

It is also possible to provide another modified form of resin impregnator C which is more fully illustrated in the sectional view of FIG. 4. The resin impregnator C generally comprises an open-ended tubular housing or canister 30 which is circular in vertical cross section and includes a relatively thick annular wall 31 which forms a central bore 32. At each transverse end, the interior surface of the annular wall 31 is provided with a neoprene rubber seal 33 having an internal diameter which is sufficient to enable the filament wound tube T to pass therethrough. An intermediate seal 34 is located midway between each of the transverse end seals 33 thereby dividing the housing 30 into a vacuum compartment 35 and a pressure compartment 36. By further reference to FIG. 4, it can be seen that the seals 33, 34 are sized to accommodate the tube T as it passes through the housing 30. Furthermore, the seals 33, 34 are sufficiently flexible to yield in order to accommodate nonlinearities in the circular dimension of the tube T passing through the housing 30. In like manner, the seals 33, 34 are often sufficiently rigid to maintain a substantially fluid-tight engagement between the surface of the tube T and the interior of the housing 30 as well as between the two compartments 35, 36.

The housing 30 is also provided with a fitting 37 in the area of the vacuum compartment 35 which is, in turn, connected to a suitable pump or the like (not shown) in order to impose a vacuum on the vacuum compartment 35. It can be seen that the fitting 37 extends through the thick annular wall 31 and opens into the central bore 32 in order to create a vacuum condition therein. Thus, as the tube T is passing through the housing, the right-hand end seal 33 and the intermediate seal 34 maintain contact with the exterior surface of the tube T to hold the vacuum condition in the compartment 35. Furthermore, the seal 34 is sufficient to prevent any of the pressure in the compartment 36 from extending into the vacuum compartment 35.

The annular wall 31 in the area of the pressure compartment 36 is provided with a series of axially spaced circumferentially disposed circular plates 38 which serve as force transducers or sonic drivers. Each of the plates 38 is in turn connected to a suitable sonic energy generator (also not shown) for generating the necessary energy to drive the resin into the tubular member passing through the housing 30. The housing is also provided with a fitting 39 and a tube 40 connected to a suitable source of liquid resin (not shown). In this manner, it is possible to continually supply a resin matrix to the housing 30.

The housing 30 is also provided with an upwardly extending hollow stand-pipe 41 which serves as an air accumulator. The standpipe 41 is provided with a removable cap 42 and a sight glass 43 which extends for the greater portion of the vertical length of the stand pipe 41. Any air which has been entrained in the various strands of the filament and which may not have been removed in the vacuum compartment 35 can be displaced by the liquid resin as the strands enter into the compartment 36. This air will be normally biased into the stand pipe 41 where it will displace and force downwardly the liquid resin therein. It should be observed that resin can also be introduced into the compartment 36 under pressure thereby obviating the employment of the sonic energy drivers. In either event, the resin which is introduced into the compartment 36 will normally flow into the interior portions of the strands since the resin in maintained under pressure and since voids now exist where air has been removed in the compartment 35.

Figure 5:
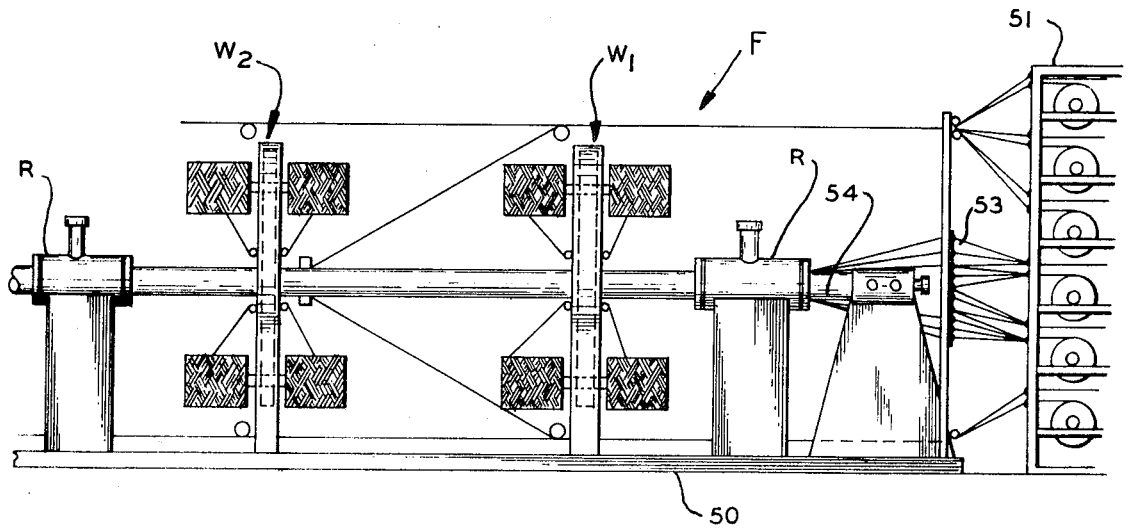
FIG. 5 is a schematic side elevational view partially broken away and showing the use of the resin impregnator of the present invention in conjunction with a filament winding apparatus.

FIG. 5 schematically discloses a filament winding apparatus for making filament reinforced tubular structures and which employs any of the resin impregnators A-C. The filament winding apparatus F generally comprises a base plate 50 and mounted on one end thereof is a spool rack 51 having a series of conventional spools of filament or so-called "roving" thereon. The roving is trained through a series of eyelets 53 and applied to a fixed mandrel 54 so that the strands are axially disposed with respect to the mandrel 54, to form a series of longitudinal strands. The strands are passed through a resin applicator R, which is equivalent to any of the resin applicators A-C. Thereafter, a series of winding stations, $W_1$, $W_2$ are located to the left of the resin applicator R for applying either helical or circumferential wound strands to the longitudinal strands. Thereafter, another applicator R, which is equivalent to any of the applicators A-C is also provided.

It should be recognized that this filament winding system is only one of the many possible uses in which the resin applicators A-C can be employed.

It should be understood that changes and modifications in the form, construction, arrangement and combination of parts presently described and pointed out may be made and substituted for those herein shown without departing from the nature and principle of my invention.

Having thus described my invention, what I desire to claim and secure by Letters Patent is:

1. A device for impregnating a resin matrix curable material into the individual closely wound impregnatable textile fiber strands of a hollow tubular member when said tubular member is retained on and moving along a fixed rigid mandrel and where each strand is formed of a plurality of textile filaments, said device comprising a tubular housing having open entrant and exit end portions and a central bore formed by an interior wall extending between said open end portions, means operatively associated with said housing for introducing said matrix curable material into said central bore, means also operatively associated with said housing to force said resin matrix into said plurality of closely wound strands and into intimate contact with each of the filaments in fluid of said strands as said strands move along said mandrel, a fluid expandable sealing ring operatively located at each of said open end portions for engaging said strands and forming a sliding liquid seal between said strands and said sealing rings as said strands move through said housing, fluid supply means operatively associated with each of said sealing rings to permit a fluid to be introduced into said rings to permit expansion and contraction responsive to the amount of fluid introduced thereinto, to thereby maintain preselected pressure engagement with the hollow tubular member and to adjust surface nonlinearities in said hollow tubular member, individual fluid supply tubes operatively connected to said fluid supply means and respective ones of said sealing rings for independently controlling the fluid introduced into the sealing ring at said entrant end portion to control pressure condtions in said central chamber and the amount of oozing of the matrix curable material outwardly of said ring and for independently controlling the amount of fluid to be introduced into the sealing ring at said exit end portion to thereby control the amount of matrix material impregnation in said strands and the amount of resin material remaining on the surface of said strands, said mandrel extending through said housing and beyond the sealing ring at the exit end portion thereof so from the the impregnated strands may be ultimately cured and removed from the mandrel as the final structural tubular member.

2. The device of claim 1 further characterized in that energizable means is operatively associated with said housing capable of producing sonic energy for forcibly urging said matrix curable material into initmate contact with said strands.

3. The device of claim 1 further characterized in that at least one transducer plate is located in said housing and surrounding said central bore and being operatively connectable to a mechanism capable of producing a source of sonic energy for applying said sonic energy across said central bore to forcibly urge said matrix curable material into intimate contact with said strands.

4. The device of claim 1 further characterized in that said housing is maintained under pressure in the area of said central bore to thereby forcibly urge said matrix curable material into intimate contact with said strands.

5. A device for impregnating a resin matrix curable material into the individual closely wound impregnatable textile fiber strands of a hollow tubular member when said tubular member is retained on and moving along a fixed rigid mandrel and where each strand is formed of a plurality of textile filaments, said device comprising a tubular housing having an elongated outer wall, an intermediate wall in said housing forming a first chamber and entrant axially aligned second chamber, said housing having an extrant open end portion communicating with said first chamber and an exit open end portion communicating with said second chamber, means forming an aperture in said intermediate wall permitting communication between said two chambers, means operatively associated with said first chamber for creating a vacuum therein to remove entrained air from said strands as said strands move along said mandrel, means operatively associated with said housing for introducing said matrix curable material into said second chamber, contact means also operatively associated with said housing to force said resin matrix into said plurality of closely wound strands and into intimate contact with each of the filaments in each of said strands as said strands move along said mandrel, a fluid expandable sealing ring operatively located at each of said open end portions and in the aperture in said intermediate wall for engaging said strands and forming a sliding liquid seal between said strands and said sealing ring as said strands move through said housing, fluid supply means operatively associated with each of said sealing rings to permit a fluid to be introduced into said rings to permit expansion and contraction responsive to the amount of fluid introduced thereinto, to thereby maintain preselected pressure engagement with the hollow tubular member and to adjust surface non-linearities in said hollow tubular member, a first individual fluid supply tube operatively connected to said fluid supply means and the sealing ring at entrant end portion for controlling the fluid introduced into the sealing ring at said entrant end portion to control vacuum conditions in said first chamber, a second individual fluid supply tube operatively connected to said fluid supply means and said sealing ring in said aperture for also independently controlling the amount of fluid to the sealing ring in said aperture to control vacuum conditions in said first chamber and the amount of oozing of the matrix curable material from said second chamber, and a third individual fluid supply tube operatively connected to said fluid supply means and to the sealing ring at said exit end portion for also independently controlling the amount of fluid to be introduced into the sealing ring at said exit end portion to thereby control the amount of matrix material impregnation in said strands and the amount of resin material remaining on the surface of said strands, said mandrel extending through said housing and beyond the sealing ring at the exit end portion thereof so that the impregnated strands may be ultimately cured and removed from the mandrel as the final structural tubular member.

6. The device of claim 5 further characterized in that the matrix contact means enables said second chamber to be maintained under pressure for forcibly urging said matrix curable material into intimate contact with said strands.

7. The device of claim 5 further characterized in that said matrix contact means comprises energizable means capable of producing sonic energy and which is operatively associated with said second chamber for forcibly urging said matrix curable material into intimate contact with said strands.

8. The device of claim 5 further characterized in that said matrix contact means enables said second chamber to be maintained under pressure to thereby forcibly urge said matrix curable material into intimate contact with said strands, and means is operatively associated with said second chamber to automatically adjust for entrained air in said strands to thereby maintain relatively constant pressure in said second chamber.

9. The device of claim 1 further characterized in that said contact means comprises energizable means operatively associated with said housing for producing high frequency energy introduced with respect to the resin matrix curable material contained within said chamber, said matrix curable material having energy coupling properties to couple the energy with respect to said strands and thereby vibrate said matrix strands to cause intimate contact of the matrix material with said strands and impregnation thereinto.

10. The device of claim 9 further characterized in that the energizable means is capable of producing sonic energy for forcibly urging said matrix curable material into intimate contact with said strands.

11. The device of claim 10 further characterized in that said energizable means comprises at least one transducer plate located in said housing and surrounding said central bore and being operatively connectable to a mechanism capable of producing a source of sonic energy for applying said sonic energy to said strands across said matrix curable material to forcibly urge said matrix curable material into intimate contact with said strands.

* * * * *